(12) United States Patent
Swamy

(10) Patent No.: US 10,696,463 B2
(45) Date of Patent: Jun. 30, 2020

(54) CLOSURE FOR CONTAINER

(71) Applicant: Berry Plastics Corporation, Evansville, IN (US)

(72) Inventor: Jay S Swamy, Chippewa Falls, WI (US)

(73) Assignee: Berry Plastics Corporation, Evansville, IN (US)

( * ) Notice: Subject to any disclaimer, the term of this patent is extended or adjusted under 35 U.S.C. 154(b) by 1259 days.

(21) Appl. No.: 14/454,283

(22) Filed: Aug. 7, 2014

(65) Prior Publication Data

US 2015/0041475 A1 Feb. 12, 2015

Related U.S. Application Data

(60) Provisional application No. 61/863,279, filed on Aug. 7, 2013.

(51) Int. Cl.
| | |
|---|---|
| *B32B 27/36* | (2006.01) |
| *B32B 27/32* | (2006.01) |
| *B65D 77/20* | (2006.01) |
| *B65B 51/10* | (2006.01) |
| *B65B 1/04* | (2006.01) |
| *B65B 3/04* | (2006.01) |
| *B32B 1/02* | (2006.01) |
| *B65B 7/28* | (2006.01) |
| *B32B 7/12* | (2006.01) |
| *B65D 53/06* | (2006.01) |

(52) U.S. Cl.
CPC ............ *B65D 77/2044* (2013.01); *B32B 1/02* (2013.01); *B32B 7/12* (2013.01); *B32B 27/32* (2013.01); *B65B 1/04* (2013.01); *B65B 3/04* (2013.01); *B65B 7/2878* (2013.01); *B65B 51/10* (2013.01); *B65D 53/06* (2013.01); *B65D 77/2096* (2013.01); *B32B 2274/00* (2013.01); *B32B 2439/00* (2013.01); *B65D 2577/205* (2013.01)

(58) Field of Classification Search
CPC ........ B65D 77/2056; B65D 2577/2091; B65D 22/00; Y10T 428/1359; Y10T 428/1334
USPC ...................... 428/35.2, 35.9, 35.7
See application file for complete search history.

(56) References Cited

U.S. PATENT DOCUMENTS

| | | |
|---|---|---|
| 3,395,038 A | 7/1968 | Lucchetti |
| 4,673,601 A | 6/1987 | Lamping et al. |

(Continued)

FOREIGN PATENT DOCUMENTS

WO WO2010114879 * 10/2010

OTHER PUBLICATIONS

International Search Report and Written Opinion for International Application No. PCT/US2014/050075, dated Nov. 5, 2014, 11 pages.

(Continued)

*Primary Examiner* — Ellen S Hock
(74) *Attorney, Agent, or Firm* — Barnes & Thornburg LLP

(57) ABSTRACT

A package includes a container and a closure. The container includes a body formed to include a product-storage region adapted to store products therein and a brim coupled to the body and formed to include a mouth opening into the product-storage region. The closure is coupled to the brim of the container by melting a portion of the closure together with a portion of the brim to block access to the products stored in the product-storage region.

20 Claims, 13 Drawing Sheets

(56) References Cited

U.S. PATENT DOCUMENTS

| | | | |
|---|---|---|---|
| 6,905,744 B1* | 6/2005 | Kataoka | A61J 1/10 428/218 |
| 2003/0099792 A1 | 5/2003 | Andersson et al. | |
| 2006/0172131 A1* | 8/2006 | Haedt | B32B 7/06 428/336 |
| 2007/0053737 A1 | 3/2007 | Morris et al. | |
| 2008/0255296 A1 | 10/2008 | Gibbons et al. | |
| 2010/0247824 A1* | 9/2010 | Chang | A61J 1/10 428/35.7 |
| 2013/0047559 A1 | 2/2013 | Minnette | |
| 2013/0131274 A1 | 5/2013 | Chou | |
| 2013/0153577 A1 | 6/2013 | Su et al. | |

OTHER PUBLICATIONS

Atmer 7373, "Effective Anti-fog for Polypropylene," Croda Europe Ltd., Sep. 2012, http://www.croda.com/assets/dpV1/files/Atmer_7373.pdf, 2 pages.

* cited by examiner

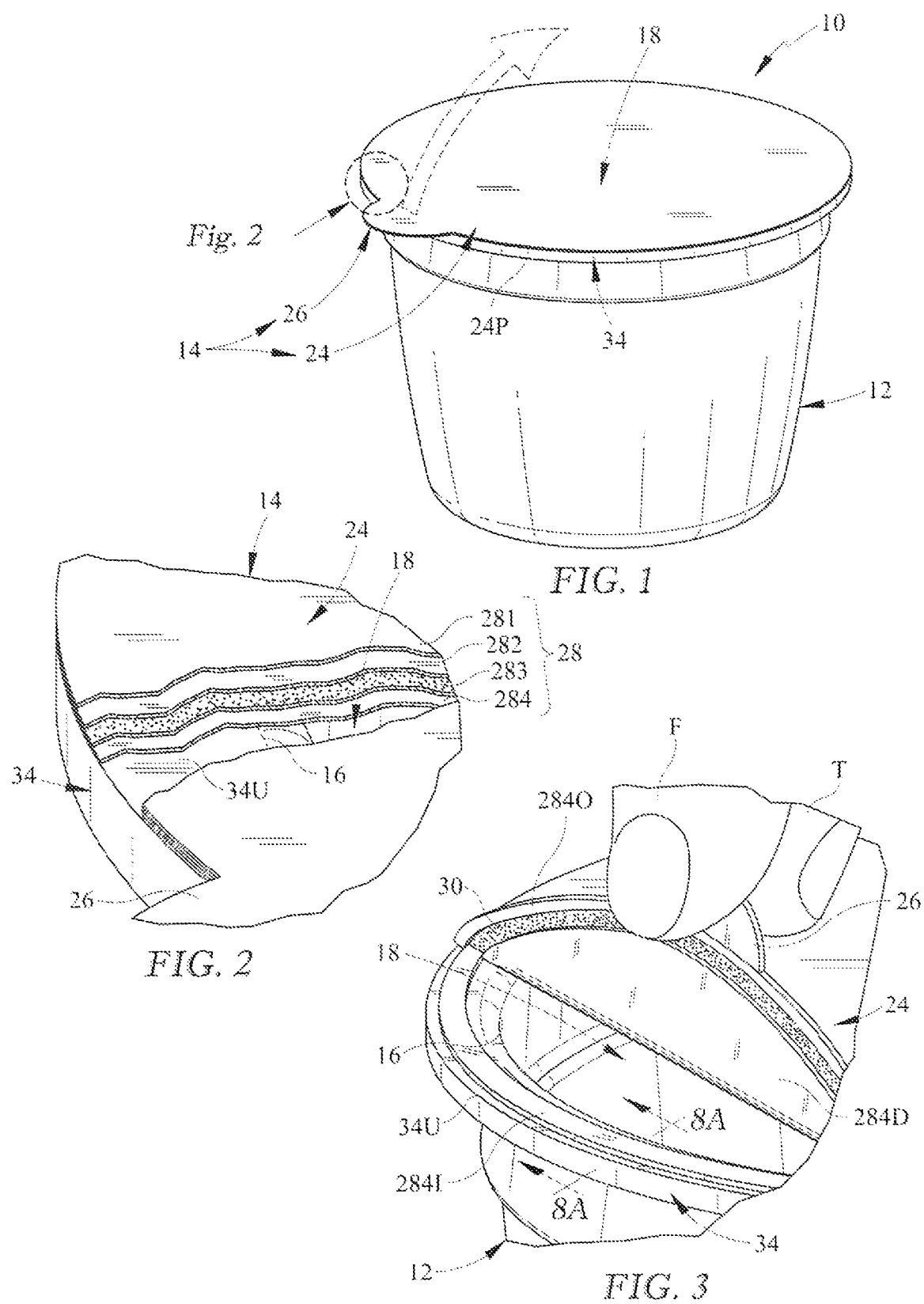

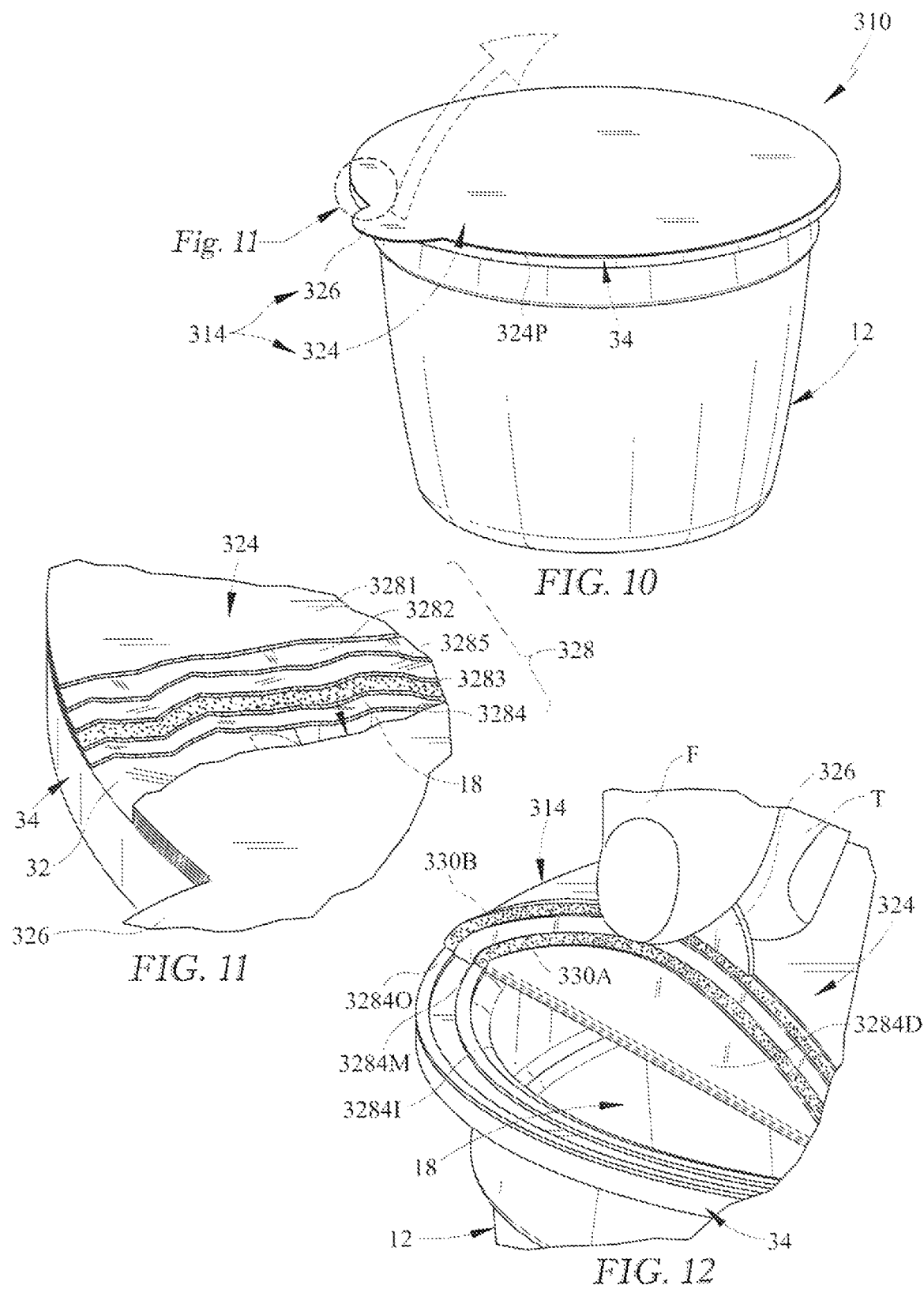

CLOSURE FOR CONTAINER

PRIORITY CLAIM

This application claims priority under 35 U.S.C. § 119(e) to U.S. Provisional Application Ser. No. 61/863,279, filed Aug. 7, 2013, which is expressly incorporated by reference herein.

BACKGROUND

The present disclosure relates to packages, and particularly to packages including a container and a cover mounted on top of the container. More particularly, the present disclosure relates to containers and covers made from plastics materials.

SUMMARY

A package in accordance with the present disclosure includes a container and a closure. The container includes a body formed to include a product-storage region adapted to store products therein and a brim coupled to the body and formed to include a mouth opening into the product-storage region. The closure is coupled to the brim of the container by melting a portion of the closure together with a portion of the brim to block access to the products stored in the product-storage region.

In illustrative embodiments, the closure is made from a peelable closure laminate. The peelable closure laminate is configured to provide means for delaminating in a controlled manner along the melted portion of the closure in response to application of a separation force to the closure to open the mouth and allow access to the products stored in the product-storage region and cause an adhesive surface to be provided which establishes an adhesive bond in response to application of a closure force applied to the closure so that the mouth is once again closed and access to the product-storage region is blocked.

In illustrative embodiments, the peelable closure laminate includes a skin layer, an adhesive layer, and a sealant layer. The skin layer is arranged to lie in spaced-apart relation to the brim of the container. The adhesive layer is positioned to lie in spaced-apart relation to the brim of the container and between the brim and the skin layer. The sealant layer is positioned to lie between adhesive layer and the brim of the container. Portions of the sealant layer melt with portions of the brim to establish a sealant ring anchor which remains coupled to the brim when the sealant layer delaminates in the controlled manner in response to application of the separation force to expose a portion of the adhesive layer.

In illustrative embodiments, the sealant layer comprises a polypropylene homopolymer and a polypropylene-based elastomer. The polypropylene-based elastomer maximizes peel consistency by minimizing undesired delamination during peeling of the closure away from the container.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a first embodiment of a package in accordance with the present disclosure showing that the package includes a round container and a removable cover formed from a peelable closure laminate that comprises several sub-layers as suggested in FIG. 2 and that the peelable closure laminate delaminates in a predetermined manner when a user opens the package as suggested in FIG. 3;

FIG. 2 is an enlarged partial perspective view taken from the circled area of FIG. 1 with portions broken away to reveal that the peelable closure laminate includes, from outside to inside, a protective layer, a skin layer, an adhesive layer, and a sealant layer;

FIG. 3 is an enlarged partial perspective view of the package of FIG. 1 after a consumer has grasped a pull tab included in the removable cover and applied a separation force to the closure to cause the removable closure to delaminate in a predetermined manner to expose portions of the adhesive layer so that a temporary adhesive bond is established upon re-application of the closure to the container as suggested in FIGS. 5 and 9;

FIG. 4 shows an illustrative container-filling and container-closing process in accordance with the present disclosure in which a container is moved on a conveyor in a factory and suggesting that the process includes the steps of: (1) filling the container with food; (2) placing a removable cover on a brim included in the container; (3) placing the removable cover and container in a container-receiving support fixture arranged to lie under a movable sealing head; (4) moving the sealing head downwardly to engage the closure including the removable cover and apply both force and heat to the closure to cause portions of the peelable closure laminate and the brim to melt together and establish an anchor which couples the removable cover to the container; and (5) discharging a sealed package configured to be delivered to a consumer;

FIG. 5 shows an illustrative container-opening and container-covering process in accordance with the present disclosure suggesting that the process includes the steps of: (1) providing a package in which the removable cover is anchored to the container; (2) grasping a pull tab included in the removable cover and applying a separation force to the closure to cause the peelable closure laminate to delaminate in a controlled manner so that portions of the peelable closure laminate peel away from the container leaving a sealant ring coupled to the brim and to cause a mouth formed in the container to be exposed as well as an adhesive contact surface to be exposed; (3) pulling the closure back toward the brim to close the mouth; (4) applying a closure force to the closure to cause the adhesive contact surface to engage the associated sealant ring formed in step 2 and establish the temporary adhesive bond; and (5) applying the closure force to the closure around a perimeter of the closure to cause the adhesive bond to be established all the way around the container between the brim and the closure;

FIG. 6 is a diagrammatic view of the closure and container associated with step 3 of the container-filling and container-closing process of FIG. 4 showing that the heater included of the sealing head provides heat to cause a portion of the sealant layer included in the peelable closure laminate to melt with a portion a film-support substrate (e.g., container brim) and establish an inner sealant ring anchor as suggested in FIGS. 7 and 7A;

FIG. 7 is a view similar to FIG. 6 associated with step 4 of the container-filling and container-closing process of FIG. 4 showing that the heater of the sealing head applies heat to portions of the sealant layer and the brim to cause the inner sealant ring anchor to be established which retains the inner sealant ring to the brim during application of the separation force to the closure as suggested in FIG. 8;

FIG. 7A is an enlarged view taken from the circled portion of FIG. 7 showing that inner sealant ring anchor is formed by melting and comingling a lower portion of the sealant layer and an upper portion of the film-support substrate in response to application of heat from the heater included in the movable sealing head;

FIG. 8 is a view similar to FIG. 7 associated with step 2 of the container-opening and container-covering process of FIG. 5 showing that the sealant layer delaminates in a predetermined manner to establish an outer sealant ring, the inner sealant ring, and a sealant disk and suggesting that an adhesive contact surface is established at the same time which is used to form an associated adhesive bond as suggested in FIG. 9;

Figure 4:
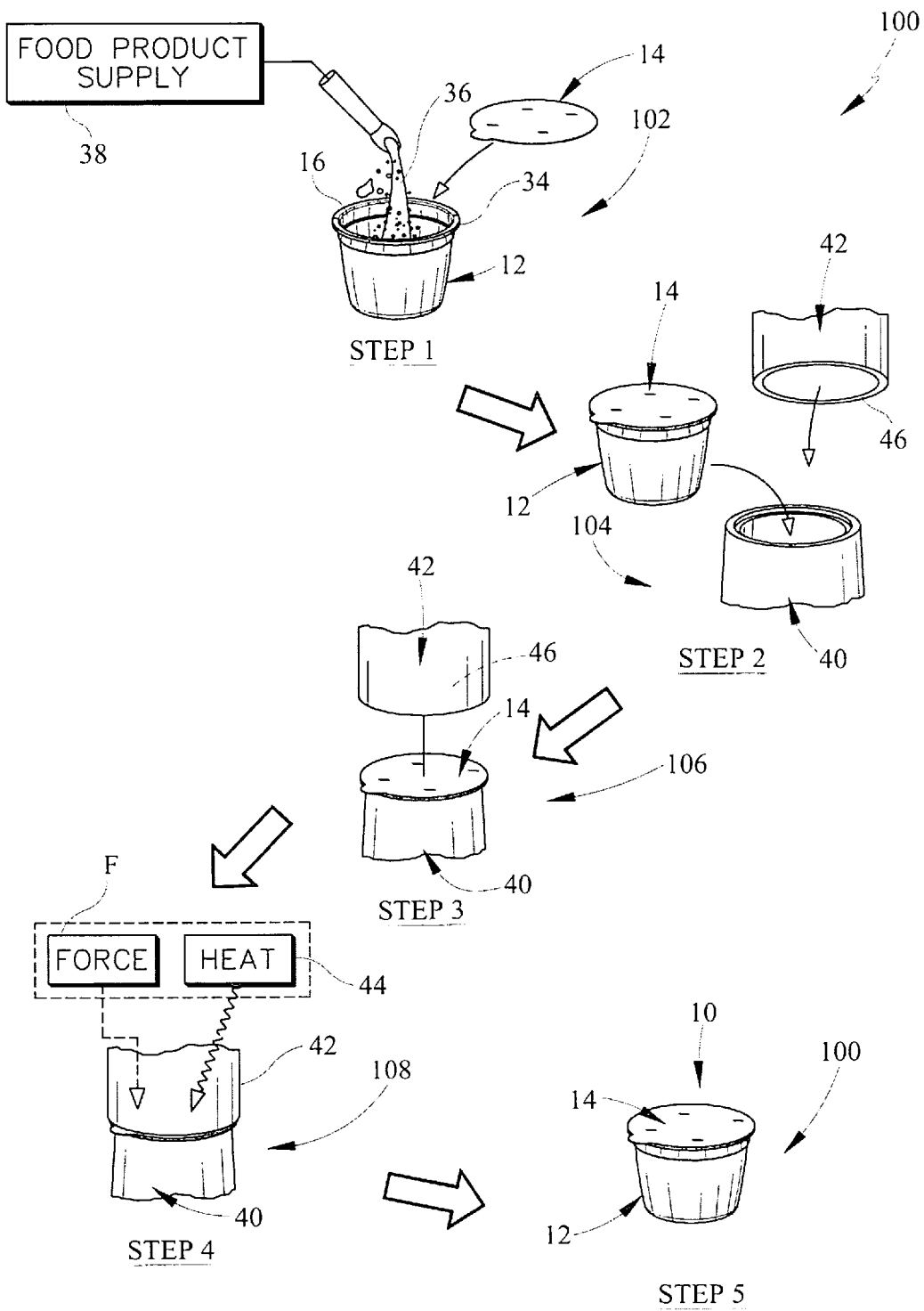
Figure 5:
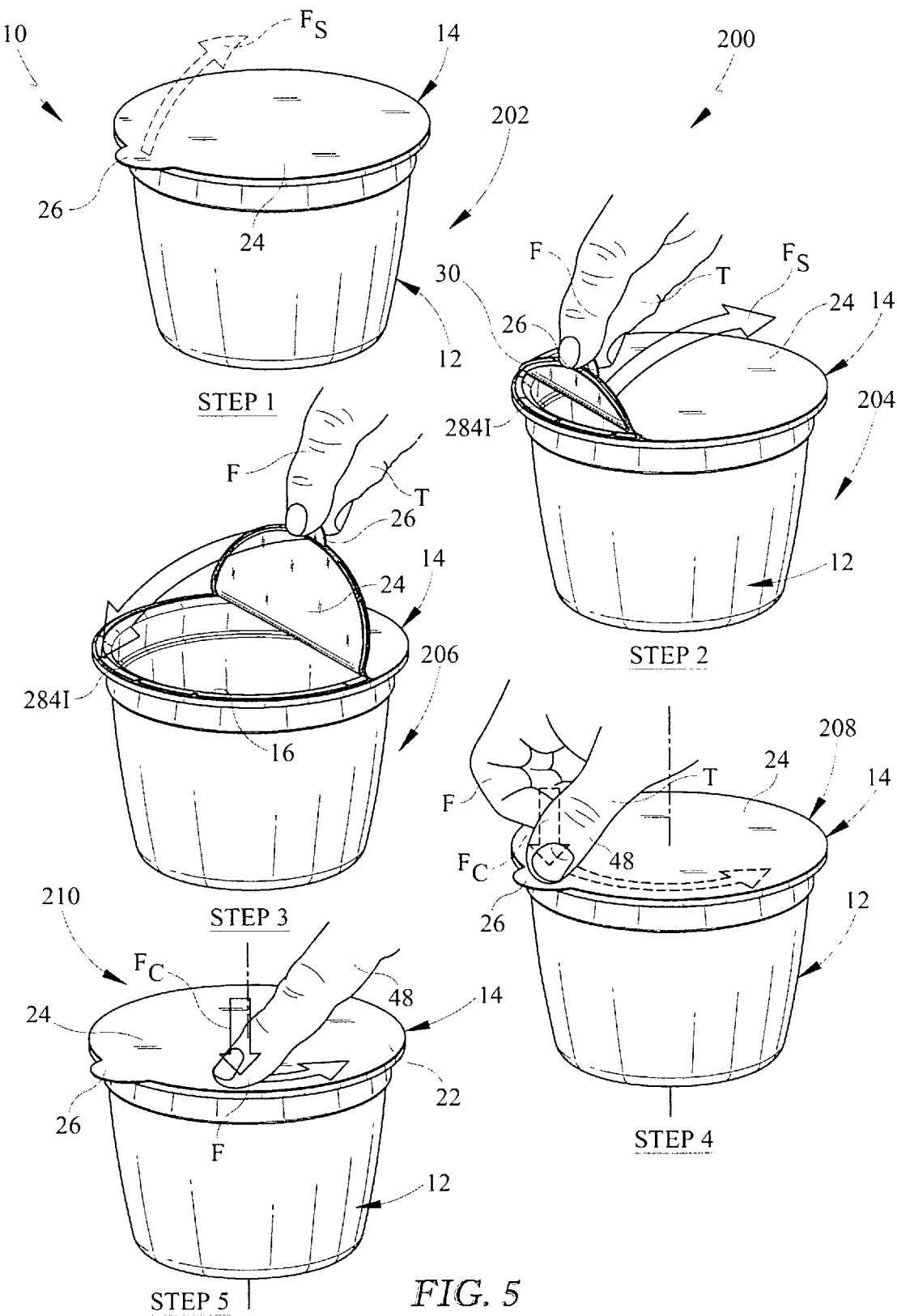
Figure 13:
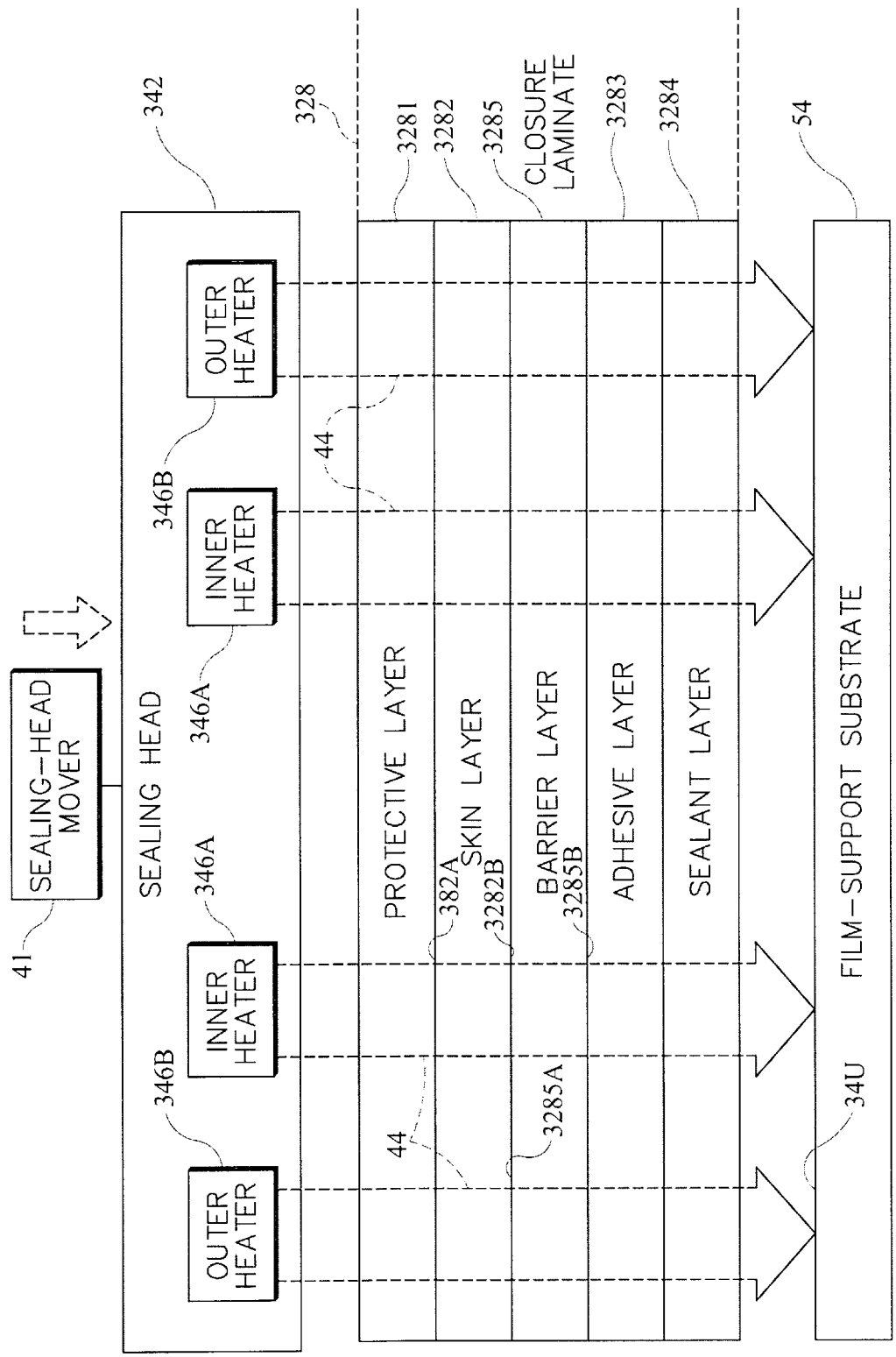
Figure 14:
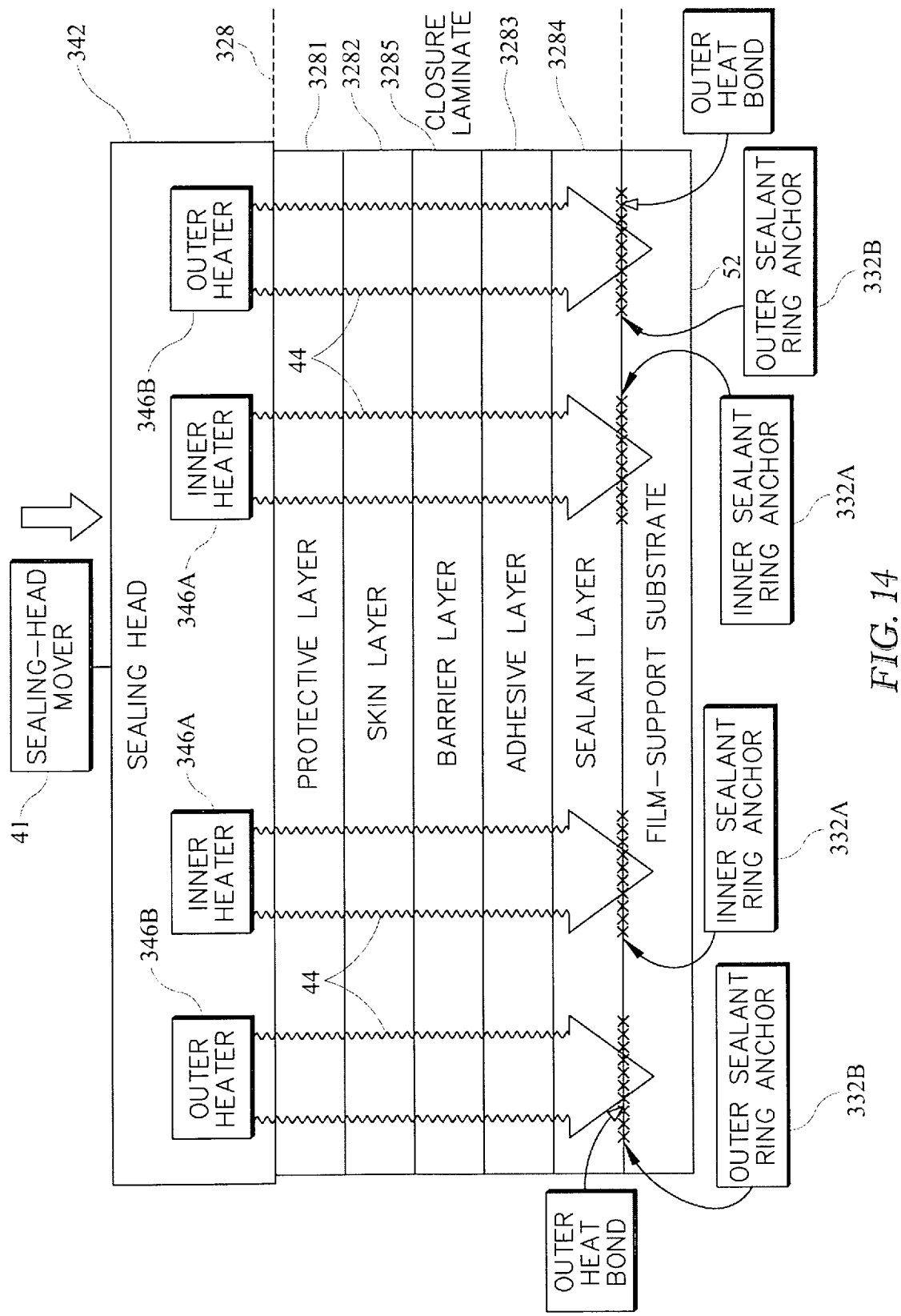
Figure 15:
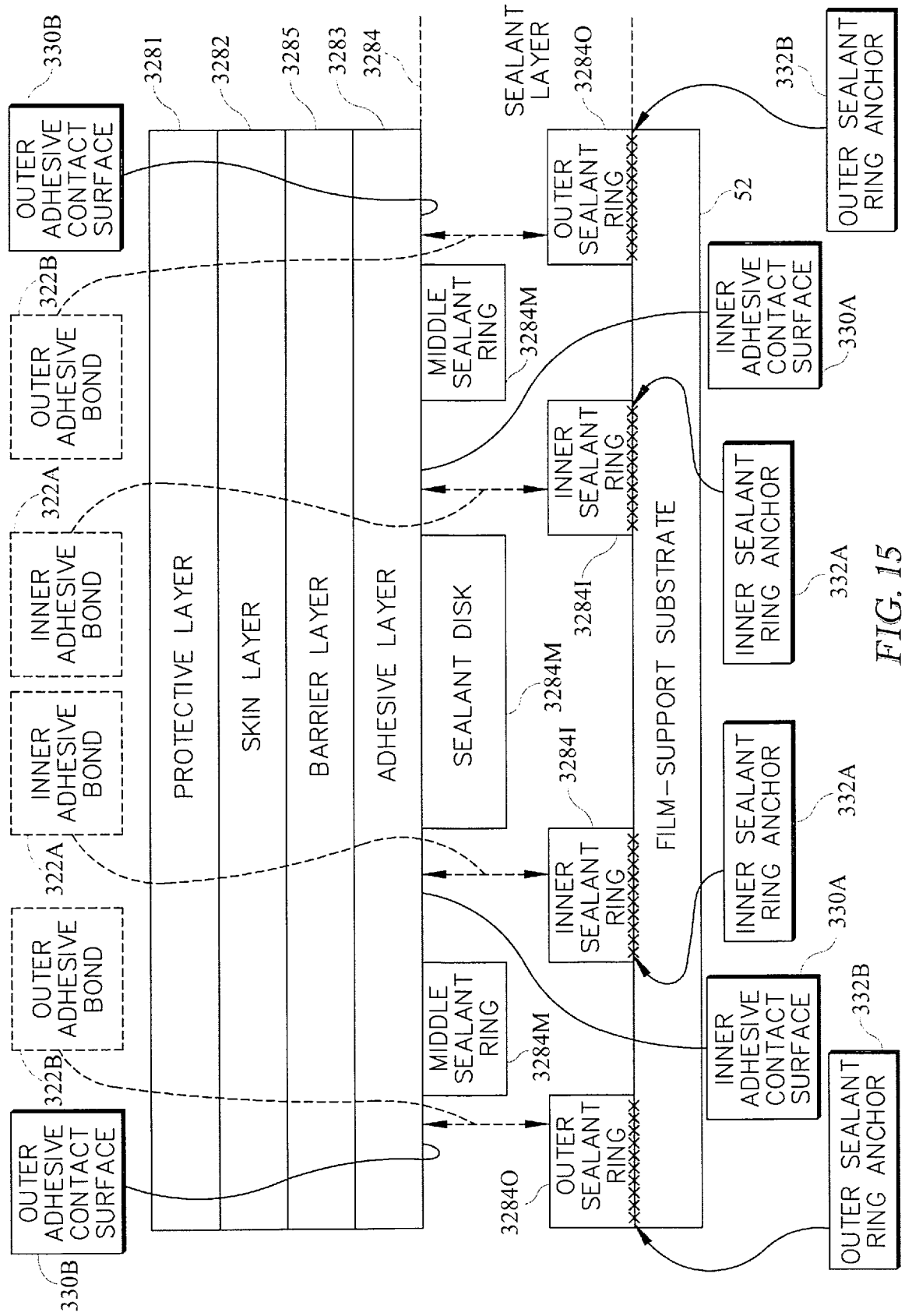
Figure 16:
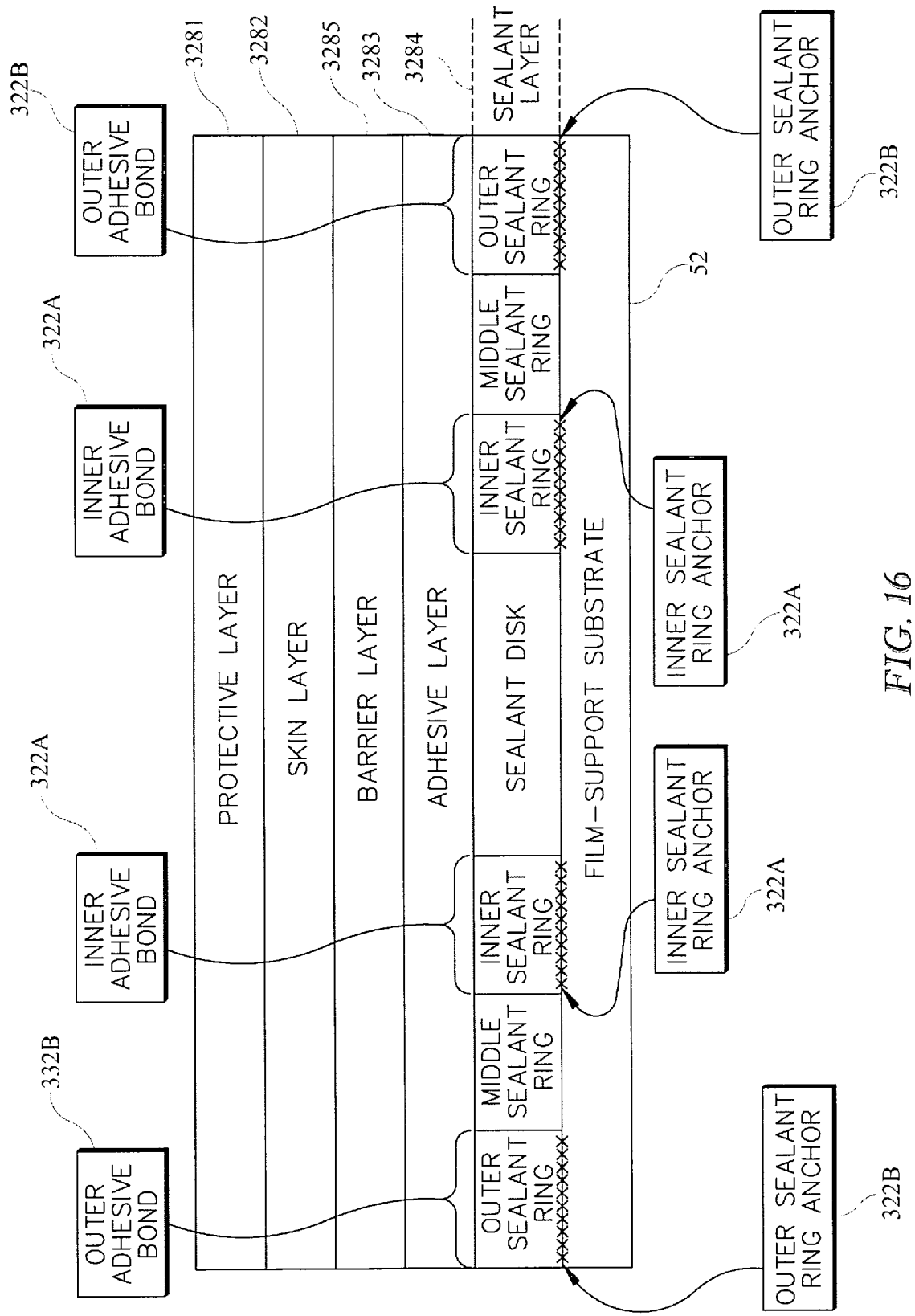

FIG. 10 is a perspective view of another embodiment of a package in accordance with the present disclosure showing that the package includes a round container and a removable cover formed from a peelable closure laminate that comprises several sub-layers as suggested in FIG. 11 and that the peelable closure laminate delaminates in a predetermined manner when a user opens the package as suggested in FIG. 12;

FIG. 11 is an enlarged partial perspective view taken from the circled area of FIG. 10 with portions broken away to reveal that the peelable closure laminate includes, from outside to inside, an outer protective layer, a skin layer, a barrier layer, an adhesive layer, and a sealant layer;

FIG. 12 is an enlarged partial perspective view of the package of FIG. 10 after a consumer has grasped a pull tab included in the removable cover and applied a separation force to the closure to cause the closure to delaminate in a predetermined manner to expose portions of the adhesive layer so that temporary adhesive bonds are established upon re-application of the closure to the container as suggested in FIGS. 15 and 16;

FIG. 13 is a diagrammatic view of the closure and container associated with step 3 of the container-filling and container-closing process of FIG. 4 showing that inner and outer heaters included in the movable sealing head provide heat to cause portions of the sealant layer included in the peelable closure laminate to melt with a film-support substrate (e.g., container brim) and establish outer and inner sealant rings as suggested in FIGS. 14 and 15;

FIG. 14 is a view similar to FIG. 13 associated with step 4 of the container-filling and container-closing process of FIG. 4 showing that the heaters of the sealing head applies heat to portions of the sealant layer and the brim to cause inner and outer sealant ring anchors to be established which operate to retain associated inner and outer sealant rings to the brim during application of the separation force to the closure as suggested in FIG. 15;

FIG. 15 is a view similar to FIG. 14 associated with step 2 of the container-opening and container-covering process of FIG. 5 showing that the sealant layer delaminates in a predetermined manner to establish the outer sealant ring, a middle sealant ring, the inner sealant ring, and a sealant disk and suggesting that inner and outer adhesive contact surfaces are established at the same time which are used to form associated inner and outer adhesive bonds as suggested in FIG. 16; and FIG. 16 is a view similar to FIG. 15 associated with step 5 of the container-opening and container-covering process of FIG. 5 showing that the inner and outer adhesive bonds are established in response to mating of the inner and outer sealant rings with the associated inner and outer adhesive contact surfaces.

DETAILED DESCRIPTION

A first embodiment of a package 10 in accordance with the present disclosure is shown, for example, in FIGS. 1-3. Package 10 includes a container 12 formed to include a product-storage region 18 in which products 36 are placed therein and closed by a removable cover 14 as shown in FIGS. 1-3. Removable cover 14 is made from a multi-layer peelable closure laminate 28 which includes, for example, a protective layer 281, a skin layer 282, an adhesive layer 283, and a sealant layer 284 as shown in FIGS. 6-9. Adhesive layer 283 has a relatively high melt Mass-Flow Rate (MFR) and sealant layer 284 comprises a polypropylene homopolymer having a relatively high melt MFR. The high melt MFR of sealant layer 284 is compatible with the high melt MFR of adhesive layer 283 which simplifies manufacture of multi-layer peelable closure laminate 28.

Container 12 is filled with products 36 and closed by removable cover 14 in a container-filling and container-closing process 100 as shown in FIG. 4. Removable cover 14 is separated from container 12 to provide access to products-storage region 18 and applied again to block access to products-storage region 18 in a container-opening and container-covering process 200 as shown in FIG. 5.

Another embodiment of a package 310 is shown, for example, in FIGS. 10-12. Package 310 includes container 12 a removable cover 314. Removable cover 314 is made from a multi-layer peelable closure laminate 328 which includes, for example, a protective layer 3281, a skin layer 3282, a barrier layer 3285, an adhesive layer 3283, and a sealant layer 3284 as shown in FIGS. 13-16. The processes shown in FIGS. 4 and 5 may be used in connection with package 310.

Package 10 comprises container 12 and removable cover 14 as shown in FIGS. 1-5. Container 12 is formed to include a mouth 16 opening into product-storage region 18 formed in container 12 as suggested in FIG. 3. Removable cover 14 is coupled initially to container 12 in response to application of heat 44 which causes portions of removable cover 14 and container 12 to melt together so that mouth 16 is closed as suggested in FIGS. 4, 6, and 7. Later, removable cover 14 is then separated from container 12 by a separation force $F_S$ so that mouth 16 is opened to allow products stored in product-storage region 18 to be removed as suggested in FIGS. 5 and 8. Removable cover 14 is then coupled again to container 12 by an adhesive bond 22 so that mouth 16 is re-closed as shown in FIGS. 5 and 9.

Figure 6:
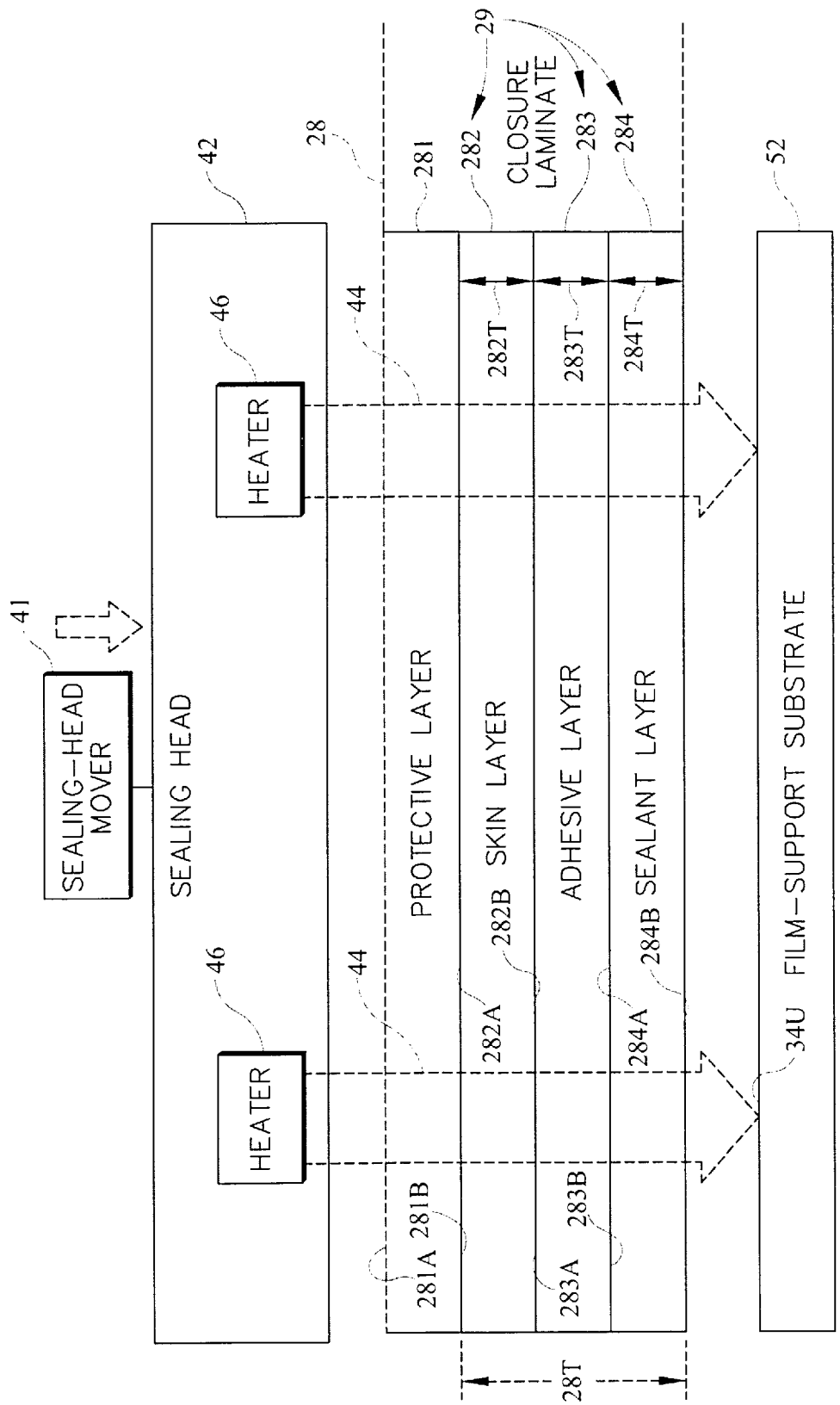

Removable cover 14 includes a closure 24 and a pull tab 26 as shown in FIG. 1. Pull tab 26 is appended to a perimeter edge 24P of closure 24 to extend away from closure 24. Pull tab 26 is adapted to be grasped between a thumb T and forefinger F of a user to apply separation force $F_S$ to closure 24. In one illustrative embodiment, both pull tab 26 and closure 24 are made from a peelable closure laminate 28 as shown in FIGS. 2 and 6. Peelable closure laminate 28 is configured to provide means for delaminating in a controlled manner where heat has melted portions of peelable closure laminate 28 to container 12 in response to application of separation force $F_S$ to cause an adhesive surface 30 to be provided which establishes adhesive bond 22 in response to application of a closure force $F_C$ applied to closure 24 so that mouth 16 is closed and communication of air between product-storage region 18 and atmosphere surrounding package 10 is blocked.

Figure 7:
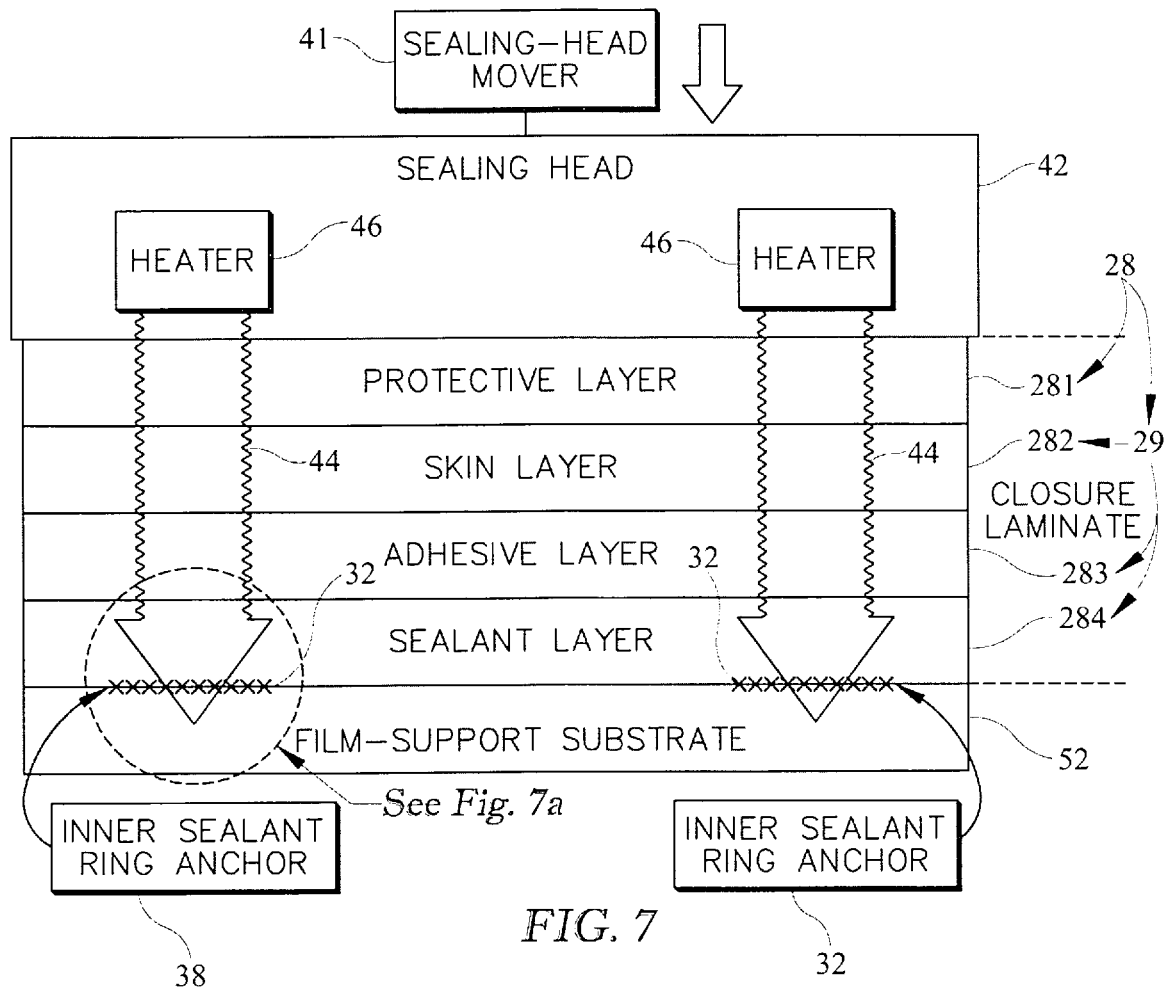
Figure 7A:
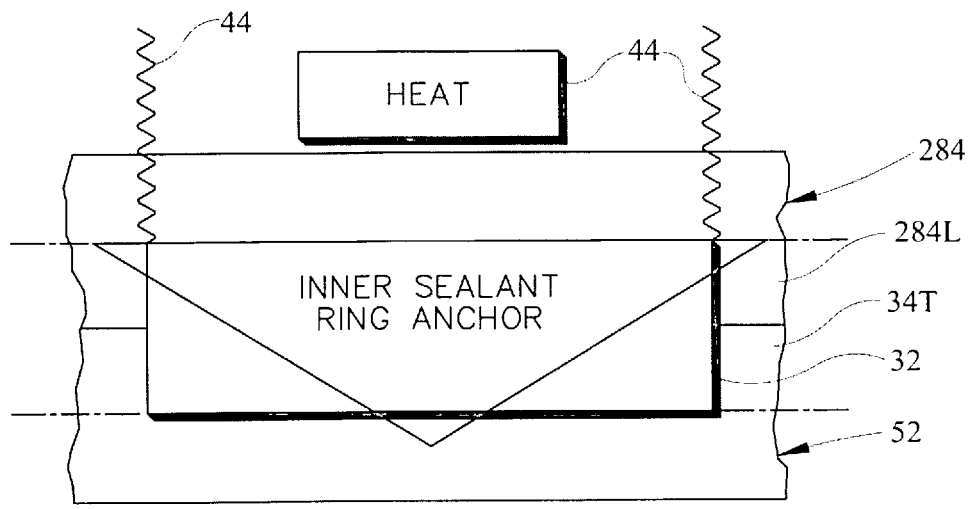
Figure 8:
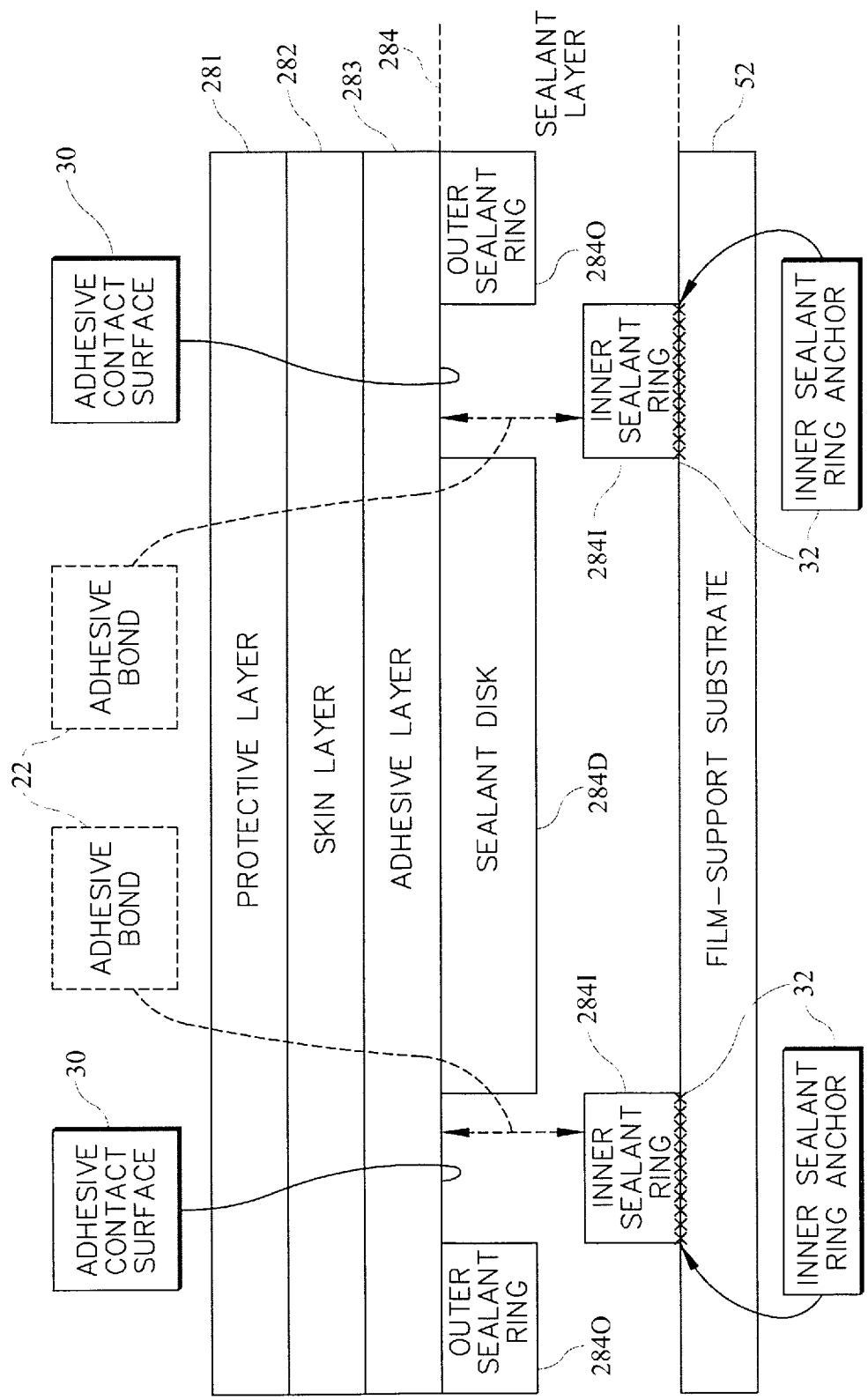
FIG. 8A is a sectional view taken along line 8A-8A of FIG. 3 showing the inner sealant ring coupled to the brim of the container by the inner sealant ring anchor which is formed by melting and comingling the lower portion of the inner sealant ring and the upper portion of the brim.
Figure 8A:
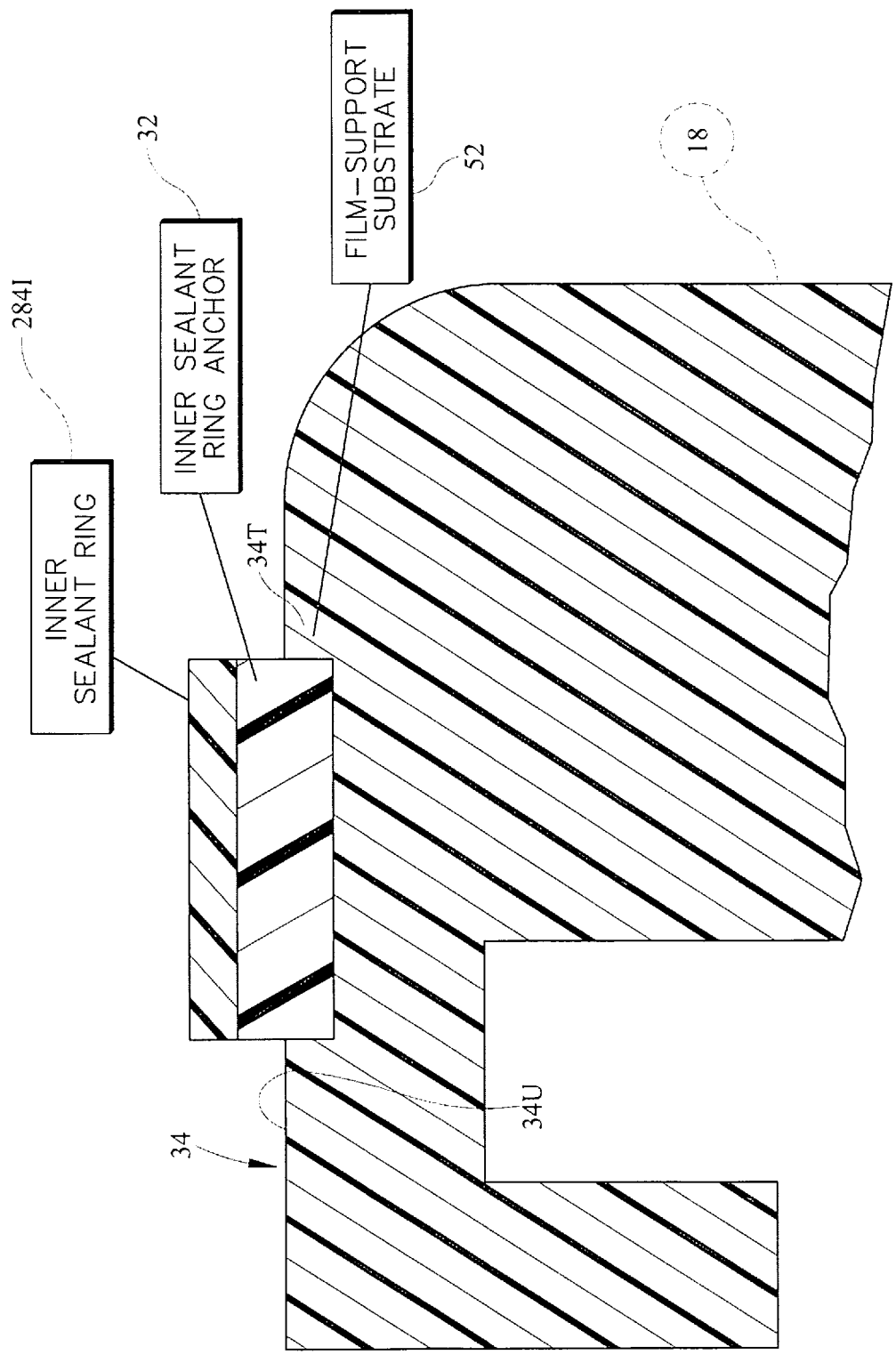
Figure 9:
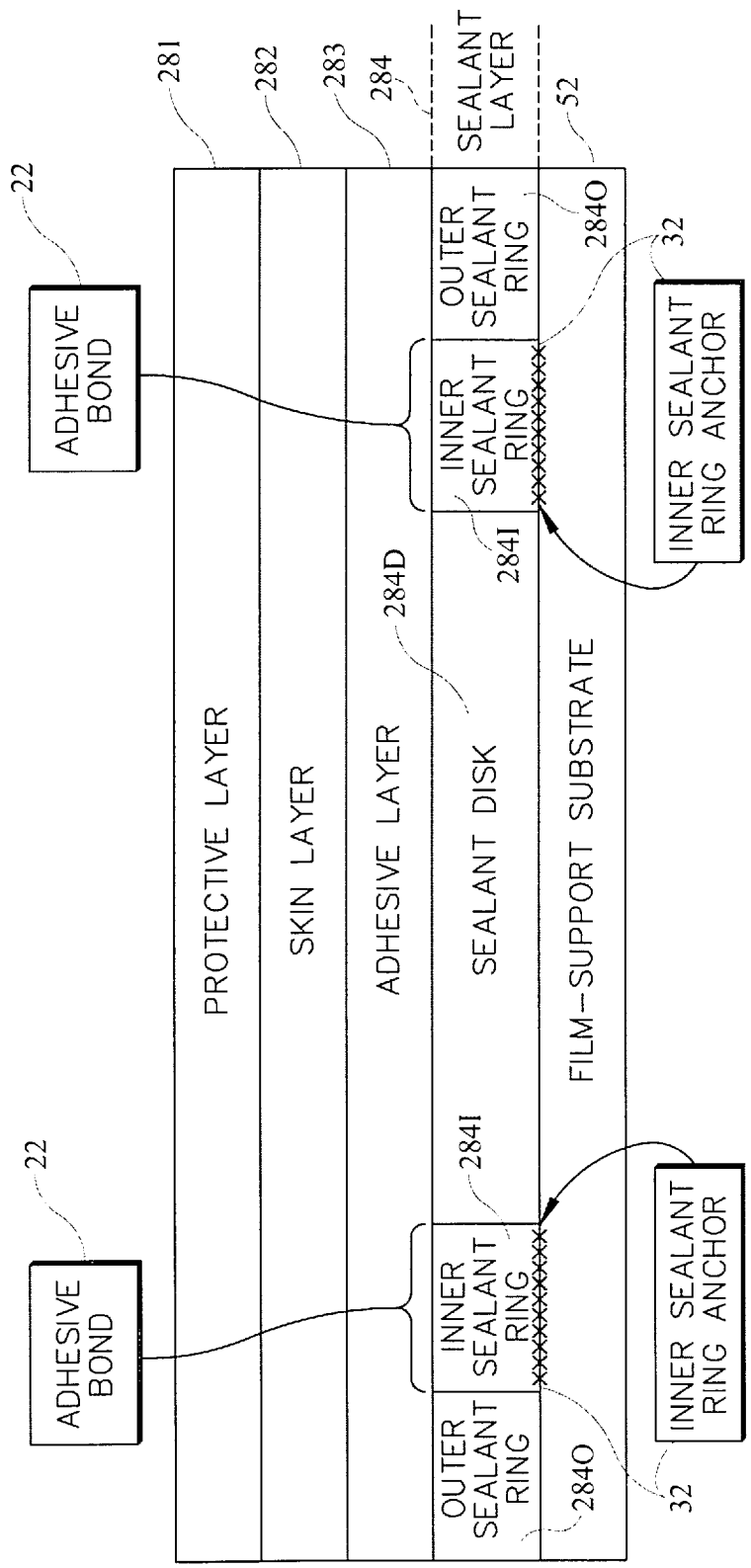
FIG. 9 is a view similar to FIG. 8 associated with step 5 of the container-opening and container-covering process of FIG. 5 showing that the adhesive bond is established in response to mating of the inner sealant ring with the associated adhesive contact surface.

Peelable closure laminate 28 includes several layers as suggested in FIG. 2 and shown in FIGS. 6-9. Peelable closure laminate 28, from outside to inside, a protective layer 281, a skin layer 282, an adhesive layer 283, and a sealant layer 284 as shown in FIGS. 2 and 6-9. In response to application of heat 44, portions of sealant layer 284 and a portion of a brim 34 included in container 12 melt together to establish an inner sealant ring anchor 32 as shown in FIGS. 7 and 7A. After application of separation force $F_S$, sealant layer 284 delaminates in a predetermined manner to cause an outer sealant ring 284O, an inner sealant ring 284I, and a sealant disk 284D to be established to cause adhesive surface 30 included in adhesive layer 283 to be exposed as shown in FIGS. 3 and 8. Inner sealant ring 284I remains coupled to brim 34 by inner sealant ring anchor 32 as shown in FIG. 8. During application of closure force $F_C$, adhesive surface 30 engages inner sealant ring 284I to establish adhesive bond 22 as shown in FIGS. 5 and 9.

An illustrative container-filling and container-closing process 100 in accordance with the present disclosure is shown in FIG. 4. Container-filling and container-closing process 100 is used to place products 36 in product-storage region 18 and close mouth 16 by coupling removable cover 14 to container 12 to establish inner sealant ring anchor as suggested in FIG. 4. As a result, communication of air or other contaminants between product-storage regions 18 is blocked until separation force $F_S$ is applied to closure 24 as suggested in FIG. 5.

Container-filling and container-closing process 100 includes several steps as suggested in FIG. 4 and begins with a filling step 102. During filling step 102, food products 36 provided by a food supply 38 are placed in product-storage region 18 through open mouth 16 as shown in FIG. 4. Process 100 then proceeds to a placing step 104. During the placing step 104, removable cover 14 is placed on brim 34 to close mouth 16 as shown in FIG. 4. Next, process 100 proceeds to a placing step 106 in which removable cover 14 and filled container 12 are placed in a container-receiving support fixture 40 which is arranged to lie under a movable sealing head 42 as shown in FIG. 4. Process 100 then proceeds to a moving step 108 in which a sealing-head mover 41 causes movable sealing head 42 to move downwardly to engage closure 24 and apply both force F and heat 44 to closure 24 to cause inner sealant ring anchor 32 to be established so as to interconnect closure 24 and container 12 as shown in FIG. 4. Finally, process 100 proceeds to a discharging step 110 in which sealed package 10 is discharged as shown in FIG. 4.

During moving step 108, heat 44 is applied by a heater 46 to a portion sealant layer 284 of closure 24 to establish inner sealant ring anchor 32 as suggested in FIGS. 4, 6, and 7. Inner sealant ring anchor 32 is formed as a result of heating and melting a lower portion 284L of sealant layer 284 and an upper portion 34T of brim 34 as shown in FIG. 7A. Inner sealant ring 284I is bonded (as shown by a series of X's) to brim 34 during moving step 108. When separation force $F_S$ is applied, bonding between sealant layer 284 and brim 34 along inner sealant ring 284I is stronger than bonding between sealant layer 284 and adhesive layer 283. As a result, sealant layer 284 ruptures along inner sealant ring 284I to cause outer sealant ring 284O and sealant disk 284D to remain coupled to adhesive layer 283 and move therewith while inner sealant ring 284I remains coupled to brim 34 as shown in FIG. 8.

Package 10 in accordance with the present disclosure is formed at the end of container-filling and container-closing process 100. An illustrative container-opening and container-covering process 200 in accordance with the present disclosure is shown in FIG. 5. Container-opening and container-covering process 200 is used to rupture sealant layer 284 in a controlled manner and separate portions of closure 24 from container 12 to open mouth 16 allowing access to products stored in product-storage region 18. As a result of separating portions of closure 24 from container 12, adhesive surface 30 is provided as shown in FIG. 5. Container-opening and container-covering process 200 is also used to re-close mouth 16 and establish adhesive bond 22 so that products remaining in product-storage region 18 are blocked from communication with air surrounding package 10.

Container-opening and container-covering process 200 begins with a providing step 202 as shown in FIG. 5. During providing step 202, package 10 is provided that includes one-piece sealant layer 284 prior to any delamination. Process 200 then proceeds to a grasping step 204 in which a user grasps pull tab 26 and applies separation force $F_S$ to closure 24 to cause peelable closure laminate 28 to delaminate in a controlled manner and peel away from container 12 so that mouth 16 is exposed. Process 200 then proceeds to a pulling step 206 in which closure 24 is pulled back toward brim 34 included in container 12. Next, process 200 proceeds to an applying step 208 in which a closure force $F_C$ is applied by a finger 48 of a user to closure 24 to cause adhesive surface 30 to engage associated inner sealant ring 284I and establish adhesive bond 22. Finally, process 200 proceeds to an applying step 210 in which closure force $F_C$ is applied to brim 34 of container 12 to cause adhesive bond 22 to be established all the way around between brim 34 and closure 24 as shown in FIG. 5.

Inner sealant ring anchor 32 and adhesive bond 22 are able to be formed as a result of peelable closure laminate 28 including several layers made from various materials configured to provide inner sealant ring anchor 32 and adhesive bond 22 during container-filling and container-closing process 100 and container-opening and container-covering process 200 as shown in FIGS. 6-9. As shown in FIG. 2 and FIG. 6, peelable closure laminate 28 includes protective layer 281, skin layer 282, adhesive layer 283, and sealant layer 284. Inner sealant ring anchor 32 is formed as a result interaction between sealant layer 284 and brim 34.

In one illustrative example, multi-layer closure laminate 28 includes protective layer 281 and a multi-layer co-extruded film 29 as shown in FIG. 6. Multi-layer co-extruded film 29 includes skin layer 282, adhesive layer 283, and sealant layer 284 as suggested in FIG. 6. Multi-layer coextruded film 29 may be produced using a blown co-extrusion process, a cast co-extrusion process, or any other suitable alternative.

As shown in FIG. 6, for example, protective layer 281 includes an outer protective surface 281A and an inner protective surface 281B. Outer protective surface 281A is arranged to face away from product-storage region 18 toward movable sealing head 42 as shown in FIG. 6. Inner protective surface 281B is arranged to face opposite outer protective surface toward skin layer 282 and product-storage region 18. During moving step 108 of process 100, heater 46 moves into contact with and engages outer protective surface 281A of protective layer 281 as shown in FIGS. 6 and 7. Heater 46 provides heat 44 which passes through protective layer 281, skin layer 282, adhesive layer 283, and causes inner sealant ring anchor 32 to be established between sealant layer 284 and brim 34 as shown in FIGS. 7 and 7A.

In one illustrative example, protective layer 281 is made from Polyethylene Terephthalate (PET). In another illustrative example, protective layer 281 is made from Oriented Polypropylene (OPP). In still yet another example, protective layer 281 is made from Bi-axially Oriented Nylon (BON). In still yet another example, protective layer 281 may include two or more sub-layers where a first sub-layer is one of PET, OPP, and BON and the second sub-layer is ink printed on an inner surface of the first sub-layer so that the ink sub-layer is located between the first sub-layer and skin layer 282. Once the protective layer 281 is formed, protective layer 281 is laminated to skin layer 282 in any suitable manner.

Skin layer 282 includes an outer skin surface 282A and an inner skin surface 282B as shown in FIG. 6. Outer skin surface 282A is arranged to face away from product-storage region 18 toward inner protective surface 281B of protective layer 281 as shown in FIG. 6. Inner skin surface 282B is arranged to face opposite outer skin surface 282A toward adhesive layer 283 and product-storage region 18.

In one illustrative example, skin layer 282 is made from Low Density Polyethylene (LDPE). In another example, skin layer 282 is made from LDPE having a melt index of about 6 g/10 min as tested according to ASTM Test Method D 1238. In still yet another example, skin layer 282 is made from PETROTHENE® NA334000 LDPE made by Lyondell Chemical Company of Houston, Tex.

In another example, skin layer 282 is made from a Linear Low Density Polyethylene (LLDPE). In another example, the skin layer 282 is made from DOWLEX™ 2035 LLDPE made by DOW® Chemical Company.

In another example, skin layer 282 is made from a hexene copolymer LMDPE. In another example, skin layer 282 is made from NOVAPOL® TF-0438-E LMDPE made by NOVA Chemicals® of Moon Township, Pa.

In another example, skin layer 282 is made from a blend of LLDPE and hexene copolymer LMDPE. In one example, the blend is about 20% by weight (wt %) LLDPE and 80 wt % hexene copolymer LMDPE. In yet another example, the blend is about 80 wt % LLDPE and about 20 wt % hexene copolymer LLDPE. The LLDPE may be DOWLEX™ 2035 LDPE made by DOW® Chemical Company and the hexene copolymer LMDPE may be NOVAPOL® TF-0438-E LMDPE made by NOVA Chemicals® of Moon Township, Pa.

In another illustrative example, skin layer 282 is made from a blend of LDPE and Linear Low Density Polyethylene (LLDPE). In another example, skin layer 282 is made from about 50 wt % PETROTHENE® NA334000 LDPE and about 50 wt % DOWLEX™ 2035 LLDPE made by The DOW® Chemical Company.

In another illustrative example, skin layer 282 is made from a blend of about 60 wt % NOVAPOL® TF-0438-E hexene LMDPE made by NOVA Chemicals® of Moon Township, Pa., 35.5 wt % DOWLEX™ 2035 LLDPE, and about 2 wt % ABC2000HC high clarity anti-block concentrate made by Polyfil Corporation of Rockaway, N.J.

In still yet another example, skin layer 282 is made from a blend of LDPE and Medium Density Polyethylene (MDPE). In yet another example, skin layer 282 is made from High Density Polyethylene (HDPE). In still yet another example, skin layer 282 is made from a blend of LLDPE and MDPE. In another example, skin layer 282 is made from a blend of LLDPE and HDPE. In yet another example, skin layer 282 is made from Polypropylene (PP).

Adhesive layer 283 includes an outer adhesive surface 283A and an inner adhesive surface 283B as shown in FIG. 6. Outer adhesive surface 283A is arranged to face away from product-storage region 18 toward inner skin surface 282B of skin layer 282 as shown in FIG. 6. Inner adhesive surface 283B is arranged to face opposite outer adhesive surface 283A and toward sealant layer 284 and product-storage region 18. Inner adhesive surface 283B is configured to provide adhesive surface 30 when sealant layer 284 delaminates during grasping step 204 of process 200.

In one illustrative example, adhesive layer 283 is a Pressure Sensitive Adhesive (PSA). The PSA may have a relatively high melt Mass-Flow Rate (MFR) (190° C./2.16 kg) as measured by NF EN ISO 1113, cond 6, which is hereby incorporated by reference in its entirety. In one example, the PSA has a melt MFR (190° C./2.16 kg) in a range of about 5 g/10 min to about 50 g/10 min. In another example, the PSA has a melt MFR (190° C./2.16 kg) in a range of about 8 g/10 min to about 45 g/10 min. In another example, the PSA has a melt MFR (190° C./2.16 kg) of about 8 g/10 min. In another example, the PSA has a melt MFR (190° C./2.16 kg) of about 45 g/10 min.

In another example, adhesive layer 283 is made from BOSTIK® M3156/T adhesive made by Bostik Limited of Staffordshire, UK. In another example, adhesive layer 283 is made from BOSTIK® M651 PSA made by Bostik Limited of Staffordshire, UK. In still yet another example, adhesive layer 283 is made from BOSTIK® M951/5 adhesive made by Bostik Limited of Staffordshire, UK. In still yet another example, adhesive layer 283 is made from a blend of about 50 wt % M651 and about 50 wt % BOSTIK® M3156/T.

Sealant layer 284 includes an outer sealant surface 284A and an inner sealant surface 284B as shown in FIG. 6. Outer sealant surface 284A is arranged to face away from product-storage region 18 toward inner adhesive surface 283B of adhesive layer 283 as shown in FIG. 6. Inner sealant surface 284B is arranged to face opposite outer sealant surface 284A and toward brim 34 and product-storage region 18. Inner sealant layer 284 is configured to provide outer sealant ring 284O, inner sealant ring 284I, and sealant disk 284D when sealant layer 284 delaminates during grasping step 204 of process 200. After grasping step 204, both outer sealant ring 284O and sealant disk 284D remain coupled to adhesive layer 283 and inner sealant ring 284I remains coupled to brim 34 by inner sealant ring anchor 32 as shown in FIG. 8.

In one illustrative example, sealant layer 284 is made from Polypropylene (PP). In another example, sealant layer 284 is made from homopolymer PP. In another example, sealant layer 284 is made from random PP. In still yet another example, sealant layer 284 is made from random or homopolymer PP having a melt flow rate of about 12 g/10 min to about 40 g/10 min. In still yet another example, sealant layer 284 is made from random or homopolymer PP having a melt flow rate of about 14 g/10 min to about 36 g/10 min. In one example, sealant layer 284 is made from TOTAL® Petrochemicals Polypropylene M3661 made by Total Petrochemicals of Houston, Tex. In another example, sealant layer 284 is made from EXXONMOBIL™ PP3155 made by EXXONMOBIL™ Chemical Company of Houston, Tex.

In another example, sealant layer 284 is made from a blend of PP and a polypropylene-based elastomer. The addition of the polypropylene-based elastomer maximizes peel consistency by minimizing formation of stringers during peeling of multi-layer peelable closure laminate 28 away from container 12. A stringer is a portion of the sealant layer which delaminates in an area other than the heat seal. In one example, the stringer remains coupled to the container 12 providing an un-attractive appearance. Together, the blend of PP and the polypropylene-based elastomer provide a clean break or separation from the PSA during peeling of multi-layer peelable closure laminate 28 away from container 12.

Elastomers are substantially amorphous polymers existing above a glass transition temperature at ambient conditions. One example of a polypropylene-based elastomer in accordance with the present disclosure is VISTAMAXX™ 3020FL made by EXXONMOBIL™ Chemical Company of Houston, Tex. VISTAMAXX™ 3020FL is an olefinic elastomer primarily composed of isotactic propylene repeat units with random ethylene distribution.

In one example, the polypropylene-based elastomer has a density of about 0.87 g/cm³. In another example, the polypropylene-based elastomer has a density of about 0.873 g/cm³. In another example, the polypropylene-based elastomer has a density of about 0.874 g/cm³. Density may be measured according to ASTM D1505 which is hereby incorporated by reference herein in its entirety.

The polypropylene-based elastomer has a melt index at 190° C./2.16 kg of about 1.1 g/10 min. The polypropylene-based elastomer has a melt Mass-Flow Rate (MFR) of about 2.0 g/10 min.

The polypropylene-based elastomer has a flexural modulus (1% secant) in a range of about 8600 psi to about 8700 psi as measured according to ASTM D790 which is hereby incorporated by reference in its entirety. In one example, the polypropylene-based elastomer has a flexural modulus (1% secant) of about 8,650 psi. In another example, the polypropylene-based elastomer has a flexural modulus (1% secant) of about 8,700 psi.

The polypropylene-based elastomer has a tensile elongation in a range of about 45% to about 48% at yield according to ASTM D412 which is hereby incorporated by reference in its entirety. In one example, the polypropylene-based elastomer has a tensile elongation of about 46% at yield. In another example, the polypropylene-based elastomer has a tensile elongation of about 48% at yield. The polypropylene-based elastomer has a tensile elongation of about 1,800% at break.

In the example where sealant layer 284 is made from a blend of PP and the polypropylene-based elastomer, the PP may be a low molecular weight polypropylene. In another example, the PP May be polypropylene homopolymer. One example of a polypropylene homopolymer in accordance with the present disclosure is EXXONMOBIL™ PP3155 made by EXXONMOBIL™ Chemical Company of Houston, Tex.

The polypropylene homopolymer may have a relatively high melt Mass-Flow Rate (MFR) (230° C./2.16 kg) as measured by ASTM D1238 which is hereby incorporated by reference in its entirety. In one example, the polypropylene homopolymer has a melt MFR (230° C./2.16 kg) in a range of about 10 g/10 min to about 50 g/10 min. In another example, the polypropylene homopolymer has a melt MFR (230° C./2.16 kg) in a range of about 30 g/10 min to about 40 g/10 min. In another example, the polypropylene homopolymer has a melt MFR (230° C./2.16 kg) of about 36 g/10 min.

In one example, the polypropylene homopolymer having a relatively high melt MFR provides for improved processing during formation of the multi-layer peelable closure laminate. In the present example, the blend of PP homopolymer and polypropylene-based elastomer is next to and adjacent the PSA. The relatively high melt MFR of the polypropylene homopolymer provides for a viscosity during extrusion which is similar to the viscosity of the PSA. As a result, interfacial instability between sealant layer 284 and adhesive layer 283 is minimized.

Elastomers are typically amorphous polymers existing above a glass transition temperature at ambient conditions. One example of a polypropylene-based elastomer in accordance with the present disclosure is VISTAMAXX™ 3020FL made by EXXONMOBIL™ Chemical Company of Houston, Tex. VISTAMAXX™ 3020FL is an olefinic elastomer primarily composed of isotactic propylene repeat units with random ethylene distribution.

In the example where sealant layer 284 is a blend, sealant layer 284 may be about 60 wt % PP and about 40 wt % polypropylene-based elastomer. In still yet another example, sealant layer 284 is a blend of about 60 wt % EXXONMOBIL™ PP3155 and about 40 wt % VISTAMAXX™ 3020FL. In another example, sealant layer 284 is a blend of about 60 wt % EXXONMOBIL™ PP3155, about 30 wt % VISTAMAXX™ 3020FL made by EXXONMOBIL™ Chemical Company of Houston, Tex., and about 10 wt % Polyvel Inc. VF-P01 anti-fog PP made by Polyvel, Inc. of Hammonton, N.J. In yet another example, sealant layer 284 is a blend of at least 50 wt % EXXONMOBIL™ PP3155 made by EXXONMOBIL™ Chemical Company of Houston, Tex. and any other suitable resin.

As shown in FIG. 6, sealant layer 284 of peelable closure laminate 28 is coupled to a film-support substrate 52. In the illustrative example of FIGS. 1-3, film-support substrate 52 is brim 34 of container 12. However, film-support substrate 52 may be a pouch made from a film configured to establish inner sealant ring anchor 32 in response to application of force and heat to peelable closure laminate 28 and the pouch. In one example, film-support substrate 52 is made from PP.

As shown in FIG. 6, skin layer 282 has a skin thickness 282T, adhesive layer 283 has an adhesive thickness 283T, and sealant layer 284 has a sealant thickness 284T. Together, skin thickness 282T, adhesive thickness 283T, and sealant thickness 284T cooperate to establish an overall thickness 28T.

In one example, skin thickness 282T is about 55% to about 60% of overall thickness 28T. In another example, skin thickness 282T is about 55% of overall thickness 28T. In yet another example, skin thickness 282T is about 60% of overall thickness 28T. In still yet another example, skin thickness 282T is about 58% of overall thickness 28T.

In one example, adhesive thickness 283T is about 26% to about 30% of overall thickness 28T. In another example, adhesive thickness 283T is about 26% of overall thickness 28T. In yet another example, adhesive thickness 283T is about 30% of overall thickness 28T. In still yet another example, adhesive thickness 283T is about 27% of overall thickness 28T.

In one example, sealant thickness 284T is about 14% to about 15% of overall thickness 28T. In another example, sealant thickness 284T is about 14% of overall thickness 28T. In yet another example, sealant thickness 284T is about 15% of overall thickness 28T.

A package 310 in accordance with the present disclosure includes container 12 and a removable cover 314 as shown in FIGS. 10-12. Removable cover 314 is coupled initially to container 12 by an inner sealant ring anchor 332A and an outer sealant ring anchor 332B as shown in FIGS. 11-14 so that mouth 16 is closed. Later, removable cover 314 is then separated from container 12 by separation force $F_S$ so that mouth 16 is opened to allow products stored in product-storage region 18 to be removed as suggested in FIG. 12. Removable cover 314 is then coupled again to container 12 by inner and outer adhesive bonds 322A, 322B so that mouth 16 is re-closed as shows in FIG. 16.

Removable cover 314 includes a closure 324 and a pull tab 326 as shown in FIG. 10. Pull tab 326 is appended to a perimeter edge 324P of closure 324 to extend away from closure 324. In one illustrative embodiment, both pull tab 326 and closure 324 are made from a peelable closure laminate 328 as shown in FIGS. 11-13. Peelable closure laminate 328 is configured to provide means for delaminating in a controlled manner along inner and outer sealant ring anchors 332A, 332B in response to application of separation force $F_S$ to cause inner and outer adhesive surfaces 330A, 330B to be provided which establishes inner and outer adhesive bonds 322A, 322B in response to application of closure force $F_C$ applied to closure 324 so that mouth 16 is closed and communication of air between product-storage region 18 and atmosphere surrounding package 310 is blocked.

Peelable closure laminate 328 includes several layers as suggested in FIG. 11 and shown in FIGS. 13-16. Peelable closure laminate 328 includes, from outside to inside, protective layer 3281, skin layer 3282, a barrier layer 3285, adhesive layer 3283, and sealant layer 3284 as shown in FIGS. 11 and 13-16. Inner and outer sealant ring anchors 332A, 332B are formed between sealant layer 3284 and upwardly facing surface 34U of a brim 34 included in container 12 in response to application of heat 344. After application of separation force $F_S$, sealant layer 3284 delaminates in a predetermined manner to cause an outer sealant ring 3284O, a middle sealant ring 3284M, an inner sealant ring 3284I, and a sealant disk 3284D to be established and to cause inner and outer adhesive surfaces 330A, 330B included in adhesive layer 3283 to be exposed as shown in FIG. 15. During application of closure force $F_C$, adhesive surfaces 330A, 330B engage outer and inner sealant ring 3284I, 3284O to establish associated inner and outer adhesive bonds 322A, 322B as shown in FIG. 15.

Container-filling and container-closing process 100, as shown in FIG. 4, may be used with package 310. As shown in FIGS. 13 and 14, a movable sealing head 342 used in process 100 includes an inner heater 346A and an outer heater 346B as shown in FIG. 14. Inner and outer heaters 346A, 346B provide heat 344 to peelable closure laminate 328 as shown in FIG. 14 to cause associated inner and outer sealant ring anchors 332A, 332B to be established between sealant layer 3284 and brim 34 of container 12. As shown in FIG. 14, inner sealant ring anchor 332A has a first radius which is relatively larger than a radius of mouth 16. Outer sealant ring anchor 332B has a second radius which is relatively larger than first radius but smaller than a radius of a perimeter edge of brim 34.

In addition, container-opening and container-covering process 200 may also be used with package 310. As a result, inner and outer adhesive surface 330A, 330B are revealed as suggested in FIG. 15. During process 200, adhesive surfaces 330A, 330B are used to establish associated adhesive bonds 322A, 322B as shown in FIG. 16.

Inner and out sealant ring anchors 332A, 332B and adhesive bonds 322A, 322B are able to be formed as a result of peelable closure laminate 328 including several layers made from various materials configured to provide inner and outer sealant ring anchors 332A, 332B and adhesive bonds 322A, 322B during container-filling and container-closing process 100 and container-opening and container-covering process 200. As shown in FIG. 11 and FIG. 13, peelable closure laminate 328 includes protective layer 3281, skin layer 3282, barrier layer 3285, adhesive layer 3283, and sealant layer 3284. Adhesive bonds 322A, 322B and sealant ring anchors 332A, 332B are formed as a result interaction between sealant layer 3284 and brim 34.

Skin layer 3282 includes an outer skin surface 3282A and an inner skin surface 3282B as shown in FIG. 13. Outer skin surface 3282A is arranged to face away from product-storage region 18 toward inner protective surface 3281B of protective layer 3281 as shown in FIG. 13. Inner skin surface 3282B is arranged to face opposite outer skin surface 3282A toward barrier layer 3285 and product-storage region 18.

Barrier layer 3285 includes an outer barrier surface 3285A and an inner barrier surface 3285B as shown in FIG. 13. Outer barrier surface 3285A is arranged to face away from product-storage region 18 toward inner skin surface 3282B of skin layer 3282 as shown in FIG. 13. Inner barrier surface 3285B is arranged to face opposite outer barrier surface 3285A toward adhesive layer 3283 and product-storage region 18.

In one example, barrier layer 3285 includes several sub-layers. For example, barrier layer 3285 includes a first tie sub-layer, a sub-layer made from a material including Ethylene Vinyl Alcohol (EVOH), and a second tie sub-layer. The EVOH is configured to maximize resistance to oxygen and moisture vapor moving through closure 324 between product-storage region 18 and an environment surrounding package 310. The first tie sub-layer is located between the sub-layer including EVOH and skin layer 3282. The second tie sub-layer is located between the sub-layer including EVOH and adhesive layer 3283.

In one example, the sub-layer including EVOH is made from 100 wt % EVAL™ J171 made by EVAL Europe nv of Antwerp, Belgium. In another example, the sub-layer including EVOH is made from 100 wt % SOARNOL™ DC3203F made by Nippon Gohsei of Osaka, Japan. The first tie layer is configured to be compatible between the sub-layer including EVOH and skin layer 3282. In one illustrative example, the first tie sub-layer includes, for example, about 85 wt % PETROTHENE® NA334000 LDPE and about 15 wt % DUPONT™ BYNEL® 41E710. The second tie layer is configured to be compatible between the sub-layer including EVOH and adhesive layer 3283. The second tie sub-layer includes, for example, about 47 wt % NOVAPOL® TF-0338-E Linear Medium Density Polyethylene (LMDPE), 38% DOWLEX™ 2035 LLDPE, and about 15 wt % DUPONT™ BYNEL® 41E710 anhydride-modified, LLDPE made by DuPont Company of Wilmington, Del. However, any other suitable formulations of the tie layers may be used.

In another example, the barrier layer may be Polyvinylidene Chloride (PVdC) coating applied to one of the other layers included in the closure laminate. In one example, the PVdC coating is applied to the protective layer. In another example, the PVdC coating is applied to the skin layer when no protective layer is present. While EVOH and PVdC may be used as suitable barrier materials, any other suitable barrier materials may be used.

The peelable and re-closeable multi-layer film structure may have one or more layers between the seal layer and the adhesive layer. These layers can be made of similar or dissimilar materials and may or may not contain functional additives such as anti-fog, odor absorbers, anti-oxidants, etc.

The present disclosure relates to peelable and re-closeable multi-layer film structure which includes 100 wt % polypropylene (homopolymer or copolymer or random copolymer polypropylene) or a blend of polypropylene and elastomer sealant (sealant layer), a pressure sensitive adhesive core (adhesive layer) and a polyolefin skin layer (skin layer). This structure can be used as a lidding film or non-forming web which can be directly bonded to another polypropylene structure, for example, a polypropylene rigid container by heat sealing or heat bonding. The structure has an easy to open feature (easy-to-peel) and when peeled, the polypropylene seal layer (sealant layer) breaks away from the pressure sensitive adhesive layer (adhesive layer) due to bond failure between the film-support structure and the sealant layer. This is the result of interfacial bond strength between the first and second layers (sealant and adhesive layers) being lower than the bond strength formed between the first sealant layer (sealant layer) and another polypropylene based structure (film-support structure) during formation of the heat bond. After the first opening, since a portion of the pressure sensitive adhesive layer is exposed, only that part of the film structure will have a re-closeability feature with which the container can be re-closed.

This co-extruded film can be laminated to PET, BON, or Oriented Polypropylene (OPP) films to increase stiffness and temperature resistance. In addition, a film containing EVOH or a PVdC coating can be also laminated to improve the barrier resistance to oxygen or moisture vapor of the closure. These laminated structures with polypropylene sealant are heat sealable to any polypropylene based rigid containers with or without a barrier layer (EVOH or other).

Example I

Multi-Layer Co-Extruded Film of Closure Laminate

One embodiment of a multi-layer co-extruded film included in the closure laminate was prepared using an extrusion process. The formulation of the multi-layer co-extruded film is shown below in Table 1.

TABLE 1

Multi-Layer Co-extruded Film Formulation

| | Resin | Resin Name and/or Supplier | Film Formulations (Approximate Resin Composition in wt %) | Percentage of Total Closure Laminate Thickness (in wt %) |
|---|---|---|---|---|
| Skin Layer | LDPE | PETROTHENE ® NA334000 | 100 | 60 |
| Adhesive Layer | PSA | BOSTIK ® M3156/T | 100 | 26 |
| Sealant Layer | PP | TOTAL ® Petrochemicals M3661 | 100 | 14 |

Example II

Multi-Layer Co-Extruded Film of Closure Laminate

One embodiment of a multi-layer co-extruded film included in the closure laminate was prepared using an extrusion process. The formulation of the multi-layer co-extruded film is shown below in Table 2.

TABLE 2

Multi-Layer Co-extruded Film Formulation

| | Resin | Resin Name and/or Supplier | Film Formulations (Approximate Resin Composition in wt %) | Percentage of Total Closure Laminate Thickness (in wt %) |
|---|---|---|---|---|
| Skin Layer | LDPE | PETROTHENE ® NA334000 | 100 | 58 |
| Adhesive Layer | PSA | BOSTIK ® M3156/T | 100 | 27 |
| Sealant Layer | PP | EXXONMOBIL ™ 3155 | 60 | 15 |
| | PP Elastomer | VISTAMAXX ™ 3020FL | 40 | |

Example III

Multi-Layer Co-Extruded Film of Closure Laminate

One embodiment of a multi-layer co-extruded film included in the closure laminate was prepared using an extrusion process. The formulation of the multi-layer co-extruded film is shown below in Table 3.

TABLE 3

Multi-Layer Co-extruded Film Formulation

|  | Resin | Resin Name and/or Supplier | Film Formulations (Approximate Resin Composition in wt %) | Percentage of Total Closure Laminate Thickness (in wt %) |
|---|---|---|---|---|
| Skin Layer | LDPE | PETROTHENE ® NA334000 | 50 | 55 |
|  | MDPE | DOWLEX ™ 2035 | 50 |  |
| Adhesive Layer | PSA | BOSTIK ® M3156/T | 100 | 30 |
| Sealant Layer | PP | EXXONMOBIL ™ 3155 | 60 | 15 |
|  | PP Elastomer | VISTAMAXX ™ 3020FL | 40 |  |

Example IV

Multi-Layer Co-Extruded Film of Closure Laminate

One embodiment of a multi-layer co-extruded film included in the closure laminate was prepared using an extrusion process. The formulation of the multi-layer co-extruded film is shown below in Table 4.

TABLE 4

Multi-Layer Co-extruded Film Formulation

|  | Resin | Resin Name and/or Supplier | Film Formulations (Approximate Resin Composition in wt %) | Percentage of Total Closure Laminate Thickness (in wt %) |
|---|---|---|---|---|
| Skin Layer | LDPE | PETROTHENE ® NA334000 | 50 | 55 |
|  | MDPE | DOWLEX ™ 2035 | 50 |  |
| Adhesive Layer | PSA | BOSTIK ® M3156/T | 50 | 30 |
|  | PSA | BOSTIK ® M651 | 50 |  |
| Sealant Layer | PP | EXXONMOBIL ™ 3155 | 60 | 15 |
|  | PP Elastomer | VISTAMAXX ™ 3020FL | 40 |  |

Example V

Multi-Layer Co-Extruded Film of Closure Laminate

One embodiment of a multi-layer co-extruded film included in the closure laminate was prepared using an extrusion process. The formulation of the multi-layer co-extruded film is shown below in Table 5.

TABLE 5

Multi-Layer Co-extruded Film Formulation

|  | Resin | Resin Name and/or Supplier | Film Formulations (Approximate Resin Composition in wt %) | Percentage of Total Closure Laminate Thickness (in wt %) |
|---|---|---|---|---|
| Skin Layer | LMDPE | NOVAPOL ® TF-0438-E | 60 | 23 |
|  | MDPE | DOWLEX ™ 2035 | 38 |  |
|  |  | ABC-2000HC | 2 |  |

TABLE 5-continued

Multi-Layer Co-extruded Film Formulation

|  | Resin | Resin Name and/or Supplier | Film Formulations (Approximate Resin Composition in wt %) | Percentage of Total Closure Laminate Thickness (in wt %) |
|---|---|---|---|---|
| First Tie Sub-Layer | LDPE | PETROTHENE ® NA334000 | 85 | 15 |
|  | LLDPE | BYNEL ® 41E710 | 15 |  |
| Barrier Material | EVOH | EVAL ™ J171 | 100 | 9 |
| Second Tie Sub-Layer | LMDPE | NOVAPOL ® TF-0338-E | 47 | 18 |
|  | MDPE | DOWLEX ™ 2035 | 38 |  |
|  | LLDPE | BYNEL ® 41E710 | 15 |  |
| Adhesive Layer | PSA | BOSTIK ® M3156/T | 100 | 20 |
| Sealant Layer | PP | EXXONMOBIL ™ 3155 | 60 | 15 |
|  | PP Elastomer | VISTAMAXX ™ 3020FL | 30 |  |
|  | PP Anti-fog | Polyvel Inc. VF-P01 | 10 |  |

The invention claimed is:

1. A package comprising
a container formed to include an interior product-storage region and a brim arranged to surround an opening that opens into the interior product-storage region and
a multilayer sheet including a sealant layer mated in direct contact with the brim of the container to close the opening that opens into the interior product-storage region formed in the container, a skin layer, an adhesive layer directly adjacent the sealant layer and arranged to interconnect the sealant layer and the skin layer, the sealant layer including a removable portion adapted to mate with the brim of the container and separate therefrom during removal of the multilayer sheet from the brim and a leave-behind portion adapted to separate from the adhesive layer and the removable portion of the sealant layer to expose a portion of the adhesive layer during removal of the multilayer sheet from the brim and to remain in a stationary position on the brim of the container after removal of a pad comprising the skin layer, adhesive layer, and the removable portion of the multilayer sheet, and sealant-layer bond means for establishing an anchor bond between the leave-behind portion of the sealant layer and a mating portion of the brim of the container that has a bond strength that is greater than an interfacial bond strength of a releasable bond between the leave-behind portion of the sealant layer and a mating portion of the adhesive layer to cause the leave-behind portion of the sealant layer to break away from the adhesive layer due to cohesive bond failure to expose a portion of the adhesive layer and to separate from the removable portion of the sealant layer in response to application of a peeling force to the multilayer sheet when the multilayer sheet occupies a container-closing position on the brim of the container,
wherein the sealant layer comprises a polypropylene homopolymer having a melt flow rate of about 12 g/10 min to about 40 g/10 min measured according to ASTM D1238.

2. The container of claim 1, wherein the melt flow rate of the polypropylene homopolymer is about 36 g/10 min measured according to ASTM D1238.

3. The container of claim 1, wherein the sealant layer further comprises a polypropylene-based elastomer.

4. The container of claim 3, wherein the polypropylene homopolymer has a melt flow rate of about 30 g/10 min to about 40 g/10 min measured according to ASTM D1238.

5. The container of claim 4, wherein the melt flow rate of the polypropylene homopolymer is about 36 g/10 min measured according to ASTM D1238.

6. The container of claim 1, wherein the polypropylene homopolymer is about 50 wt % to 100 wt % of the sealant layer.

7. The container of claim 6, wherein the sealant layer further comprises a polypropylene-based elastomer.

8. The container of claim 7, wherein the polypropylene-based elastomer is up to 50 wt % of the sealant layer.

9. The container of claim 8, wherein the polypropylene-based elastomer is about 30 wt % to 40 wt % of the sealant layer.

10. The container of claim 1, wherein the sealant layer further comprises a polypropylene-based elastomer and the polypropylene-based elastomer is about 40 wt % of the sealant layer.

11. The container of claim 10, wherein the polypropylene-based elastomer has a melt flow rate of about 2 g/10 min measured according to ASTM D1238.

12. The container of claim 11, wherein the polypropylene homopolymer has a melt flow rate of about 36 g/10 min measured according to ASTM D1238.

13. A container closure comprising
a multilayer sheet including a sealant layer adapted to mate in direct contact with a brim of a container to close an opening bounded by the brim that opens into an interior product-storage region formed in the container, a skin layer, an adhesive layer directly adjacent the sealant layer and arranged to interconnect the sealant layer and the skin layer, the sealant layer including a removable portion adapted to mate with the brim of the container and separate therefrom during removal of the multilayer sheet from the brim and a leave-behind portion adapted to separate from the adhesive layer and the removable portion of the sealant layer to expose a portion of the adhesive layer during removal of the multilayer sheet from the brim and to remain in a stationary position on the brim of the container after removal of a pad comprising the skin layer, adhesive layer, and the removable portion of the multilayer sheet, and sealant- layer bond means for establishing an anchor bond between the leave-behind portion of the sealant layer and a mating portion of the brim of the container that has a bond strength that is greater than an interfacial bond strength of a releasable bond between the leave-behind portion of the sealant layer and a mating portion of the adhesive layer to cause the leave-behind portion of the sealant layer to break away from the adhesive layer due to cohesive bond failure to expose a portion of the adhesive layer and to separate from the removable portion of the sealant layer in response to application of a peeling force to the multilayer sheet when the multilayer sheet occupies a container-closing position on the brim of the container, wherein the sealant layer comprises a polypropylene having a low molecular weight.

14. The container closure of claim 13, wherein the polypropylene is a homopolymer polypropylene.

15. The container closure of claim 13, wherein the polypropylene is a random polypropylene.

16. The container closure of claim 15, wherein the polypropylene has a melt flow rate that is about 14 g/10 min to about 36 g/10 min measured according to ASTM D1238.

17. The container closure of claim 13, wherein the sealant layer further comprises a polypropylene-based elastomer.

18. The container closure of claim 17, wherein the polypropylene is about 60 wt % of the sealant layer and the polypropylene-based elastomer is about 40 wt % of the sealant layer.

19. The container closure of claim 17, wherein the sealant layer further comprises an anti-fog polypropylene.

20. The container closure of claim 19, wherein the polypropylene is about 60 wt % of the sealant layer, the polypropylene-based elastomer is about 30 wt % of the sealant layer, and the anti-fog polypropylene is about 10 wt % of the sealant layer.

* * * * *